United States Patent [19]

Eickmann

[11] Patent Number: 4,662,584
[45] Date of Patent: * May 5, 1987

[54] ARRANGEMENTS OF OR TO PROPELLERS TO IMPROVE THE CAPABILITIES OF PROPELLER-DRIVEN CRAFT

[76] Inventor: Karl Eickmann, 2420 Isshiki, Hayama-machi, Kanagawa-ken, Japan

[*] Notice: The portion of the term of this patent subsequent to Jan. 29, 2002 has been disclaimed.

[21] Appl. No.: 664,262

[22] Filed: Oct. 24, 1984

Related U.S. Application Data

[63] Continuation-in-part of Ser. No. 330,980, Dec. 14, 1981, abandoned, and a continuation-in-part of Ser. No. 110,157, Jan. 7, 1980, abandoned, and a continuation-in-part of Ser. No. 895,687, Apr. 12, 1978, abandoned, said Ser. No. 895,687, is a continuation-in-part of Ser. No. 760,006, Jan. 17, 1977, Pat. No. 4,136,845, said Ser. No. 760,006, is a continuation-in-part of Ser. No. 104,676, Mar. 8, 1971, Pat. No. 3,823,898.

[51] Int. Cl.4 .............................................. B64D 27/00
[52] U.S. Cl. ..................... 244/54; 244/12.1; 244/105
[58] Field of Search ............... 244/12.1, 12.4, 7, 6, 244/105, 106, 52, 53, 54, 55, 56, 65, 66, 123, 60

[56] References Cited

U.S. PATENT DOCUMENTS

| | | | |
|---|---|---|---|
| 1,398,353 | 11/1921 | Winckelmann | 244/65 |
| 2,360,433 | 10/1944 | Magruder | 244/123 |
| 2,514,639 | 7/1950 | Haack | 244/56 |
| 2,988,152 | 6/1961 | Katzenberger et al. | 244/123 |
| 3,211,399 | 10/1965 | Eickmann | 244/60 |
| 3,289,980 | 12/1966 | Hill | 244/56 |
| 4,093,155 | 6/1978 | Kincaid, Jr. | 244/56 |
| 4,496,120 | 1/1985 | Eickman | 244/56 |

Primary Examiner—Galen Barefoot

[57] ABSTRACT

Propellers are provided to drive a vehicle or to bear a vehicle in air. Such propellers have commonly been fixed to wings or fuselages. The fixed locations of the propellers limited the abilities and capabilities of the respective vehicle. The invention now provides arrangements on or to propellers which makes it possible to change the location of the respective propeller relative to another portion of the vehicle. The change of the location of the propeller in relation to another portion of the vehicle makes it possible to improve the abilities or capabilities of the vehicle. Specifically beneficial effects are obtained by applying the invention to propeller-pairs. Specific relations of locations of propellers to wings or to flow of air in combination with means to pivot portions of the arrangement(s) can lead to better overall efficiencies, speeds, bearing capacities, economy or comfort of the vehicle or of portions thereof.

6 Claims, 7 Drawing Figures

ARRANGEMENTS OF OR TO PROPELLERS TO IMPROVE THE CAPABILITIES OF PROPELLER-DRIVEN CRAFT

REFERENCE TO RELATED APPLICATIONS

This is a continuation in part application of my co pending application Ser. No. 330,980, now abandoned, filed on Dec. 14, 1981 as a continuation in part application of my earlier patent application, Ser. No. 110,157, which was filed on Jan. 7th, 1980, now abandoned, as a continuation in part application of the that time co-pending application, Ser. No. 895,687, filed on Apr. 12, 1978 which is now abandoned. Application Ser. No. 895,687 was a continuation in part application of my earlier application, Ser. No. 760,006, filed on Jan. 17th, 1977. Application Ser. No. 760,006 is now U.S. Pat. No. 4,136,845 and issued on Jan. 30th, 1979. Application Ser. No. 760,006 was a continuation in part application of my still earlier application Ser. No. 104,676, filed on Mar. 8th, 1971, now U.S. Pat. No. 3,823,898. Application Ser. No. 104,676 itself arrived from earlier applications, which are mentioned in now granted U.S. Pat. No. 3,823,898. The eldest application therein is application Ser. No. 328,395 of Dec. 5th, 1963, now U.S. Pat. No. 3,220,898. Another important application therein is application Ser. No. 551,023 of May 18th, 1966, now abandoned. Priority for the equalness of rates of flow in flows to hydraulic motors which drive propellers is thereby substantiated by application Ser. No. 328,395 of Dec. 5th, 1963 and the priority for the use of such drive to propeller vehicles forward and maintain their straight forward path by equally driven propeller pairs which one propeller of each pair on another side of the vehicle is obtained by application Ser. No. 551,023 of May 18th, 1966.

This present patent application is also a divisional of my at the filing date of the parental co-pending patent applications, Ser. No. 954,555 which was filed on Oct. 25th, 1978 and of co-pending patent application, Ser. No. 973,780, which was filed on Dec. 27th, 1978 as a continuation in part application of Ser. No. 760,006, now U.S. Pat. No. 4,136,854. Application Ser. No. 954,555 is now U.S. Pat. No. 4,358,073, issued on Nov. 12, 1982.

BACKGROUND OF THE INVENTION

A propeller consumes a certain power at stand of the vehicle, when the vehicle is not moving and it consumes another power for the creation of thrust, when the vehicle moves forward, whereby the propeller moves forward relatively to the air of the atmosphere or to the water wherein or on the vehicle moves.

The power consumed by the propeller varifies with the speed of the vehicle for any amount of desired thrust.

It was custom heretofore to use variable pitch propellers to obtain the best propeller efficiency at different speeds of the vehicle.

It was also proposed in the past to use propeller pairs of different numbers of propeller blades to drive ships by multiple propeller pairs. At those drives of ships it was also already proposed to use different pitches of the propellers to obtain a running of the ship with a minimum of vibration.

However, it was never tried to use a plurality of propeller-pairs with equal pitches of the propellers of the same pair but different pitches of the propellers of another pair and to varify automatically the power supply to the different propeller pairs in order to supply to each propeller pair the different powers for different speeds.

If however, such power division would become possible, the vehicle could be driven by propeller pairs of simple propellers with fixed-pitch, inexpensive propellers, but different pitches in different propeller pairs. And, such vehicle would then be able to run with good efficiencies at different forward speeds.

SUMMARY OF THE INVENTION

When a propeller rests relatively to the fluid, like water or air, wherein it is applied, it consumes the power:

$$N = \sqrt{S^3/2\rho F} \qquad (1)$$

But, when the propeller moves forward relatively to the fluid, it consumes the power:

$$N = 0.5 \rho C_w A V_o^3 \qquad (2).$$

In the above equations the following values are applying:

N=power f.e. in kgm/s
S=thrust in KG.
$\rho$=density of fluid; f.e. 0.125 kgs$^2$/m$^4$ for air;
F=Area of propeller circle=d$^2\pi$/4 f.e.in m$^2$ with d=diameter of the propeller; for example, in m.
A=vertical projection of the propeller-blade f.e. in m$^2$.
Vo=relative velocity of the rotary speed of the propeller-blade relatively to the fluid, for example in m/s.
Cw=drag coefficient of the propeller-blade.
Vo=is 2R$\pi$n/60 in m/s for R=radius of prop in m for the respective propeller area and n=RPM.

The above equations are proven in my U.S. Pat. No. 4,387,866 which issued on June 14, 1983 and in my German patent publication No. 2,903,389 of Oct. 10th, 1979.

In said publications the development of the above equations can become studied.

Equation (2) is given in the said patent for an aircraft, or an aircraft wing. The propeller-blade is acting in the same way as an aircraft wing, when not seen in the direction of movement of the propeller's axis but seen in the direction of movement of the propeller blade relatively to the surrounding fluid. Equation (2) can therefore be applied to a propeller-blade as well as to an aircraft wing. The power consumption of the propeller is then obtained by calculating and summarizing all consumed powers of all blade portions.

In equation (2) appears the drag-coefficient Cw. This coefficient depends strongly on the angle of attack of the propeller and the angle of attack is a function of the pitch of the propeller and of the forward speed of the vehicle, because with increasing forward speed of the vehicle the angle of attack decreases, when the propeller has a fixed, constant pitch.

The value of the drag coefficient Cw is commonly around 0.04 at angle of attack about zero and it rises to about 0.2 at angle of attack about 15 degrees.

The invention now considers, that the vehicle should be driven by a single power plant and said plant should drive at least two propeller pairs. Then the fact exists, that only the installed power is available for the vehicle and it can not be rised over the installed power.

The vehicle intends to fly economically at a higher forward speed, or to move at a higher forward speed. At such high forward speed the propeller pair requires a suitable angle of attack in order to obtain the best traction or thrust at the respective forward speed. The propellers to drive the vehicle at such forward speed therefore require a high pitch of the fixed propeller's constant pitch, because the forward speed requires such high angle of pitch in order to obtain the suitable angle of attack at the mentioned forward speed.

When the same propeller would be used with the so installed propeller pitch to run the vehicle with slow speed, the active angle of attack would become so high, that the power required would be so high, that the installed power would not be able any more to revolve the propeller. Because the propeller pitch for high forward speed would then give an angle of attack, probably even higher than the mentioned 15 degrees and the drag coefficient would become so high, that the engine would fail to supply enough power to revolve the propeller with enough rotary speed.

To run the vehicle effectively at start or at low speed it would, therefore, be required to give the propeller pair a smaller angle of attack in order, that the engine or power plant has enough power to spin the propellers around with enough rotary velocity.

But, when the propellers would get such a small pitch to be suitable for running the vehicle at low speed, the propellers would have too small an angle of attack at the higher forward speed, that they would not bite then any more and the craft or vehicle would then not be able any more to obtain such a high speed as the installed power could give the vehicle when it would have propellers with suitable angle of attack at the higher forward speed.

The invention solves these problems thereby, that it drives at least two propeller pairs by a transmission means between the power plant and the propellers. Hereto it adds, that the propellers of one of the pairs have another pitch than the propellers of the other propeller pair. For example, one propeller pair for a slower forward speed and the other propeller pair for a higher forward speed of the vehicle. To held the vehicle simple and inexpensive in production, the invention applies in addition a fixed ratio of transmission speed between the power plant and the propellers. Thereby the propellers of equal pairs revolve with equal rotary velocities. The rotary direction may be opposite, when the propellers of the pair are arranged on opposite sides of the vehicle.

By this solution of the invention, the novel and highly desireable effect appears, that at the lower speed one of the propeller pairs effectively bites and accellerates the vehicle forward to enter the higher speed range as quick as possible. True, the propellers of the higher-speed pair have now too high an angle of attack and they are braking the speed of the propellers or they are restricting the revolutions of them. But as soon as the higher speed range is obtained, the propellers of the higher speed range pair will bite effectively, while the propellers of the lower speed pair are now having a very small or negative angle of attack and therefore now, in the higher speed range consume only little power.

The novel and highly effective solution of the invention now is, that gradually with increase of the forward speed of the vehicle, more and more of the power goes to the higher speed range propeller pair. Or, in other words, during the accelleration proceedure of the vehicle the portions of power supplied to the propeller pairs change or vary relatively to each other. The power portion transfered to the higher speed range propeller pair increases with increase of forward speed of the vehicle relatively to the power portion supplied to the lower speed propeller pair.

Thus, the power available is stepplessly variable between the propeller pairs depending on the forward motion speed of the vehicle. The power is automatically and without any pilot-action or driver-action more and more supplied to the higher speed propeller pair, when the speed of the vehicle increases.

The total installation of power to the vehicle of the invention is thereby less than would be required, when the vehicle would run with propellers with equal pitch only, or when each propeller would have an individual power plant.

Due to another object of the invention, the transmission is a multi flow fluid drive of individual flows of equal rate of flows in individual flow pairs which enforces equal rotary velocities in individual propeller pairs.

Another object of the invention is, to mak at least one pair of flows of the the fluid drive variable by application of a variable multiple flow pump in order to be able to selectively influence the power portion to be transfered to the respective propeller pair.

It is also possible to apply plural variable multi-flow pump sets in order to operate different propeller pairs at different forward speeds of the vehicle, whereby most economic propeller efficiencies of different propeller pairs can be obtained at both speed ranges, the lower and the higher forward speed range. Thereby almost all available power can be transfered to the lower speed propeller pair at lower forward speed of the vehicle, while almost all of the available power can be transferred to the higher speed range propeller pair at the higher forward speed of the vehicle and in speed ranges therebetween the power can be delievered in the right proportion to one or the other or both of the installed propeller pairs.

With the above described technological background, it is now possible to engage the specific objects of the present invention.

The main object of the invention is, to provide an arrangement to at least one propeller with means to varify at least one portion in relation between a propeller and its neighborhood in order to obtain a specific capability. In order to obtain the best benefit from the arrangements of the invention, it is strongly recommended to obey the following rules and equations of my mentioned co-pending applications or of others of my literatures:

$\rho$ = Density of air or fluid, for example = 0.125 Kg s$^2$/m$^4$ m = Mass of air or fluid, for example = rho·F·V1

Vo = Velocity of air or fluid in fluid stream before the propeller f·e·m/s

V1 = Velocity of fluid through propeller-circle; f.e. m/s

V2 = Velocity of fluid in fluid stream after the propeller; f.e. m/s

V2h = Velocity after propeller, if propeller revolves in stand

Vsf = Velocity after propeller, if propeller flies forward along axis $$V1h = \sqrt{S/2\rho F} = \sqrt[3]{N/2\rho F} = m/s$$

$$V1f = (V_0 + V_2)/2 = m/s$$

$$V2h = 2V_{ih} = \sqrt[3]{4N/\rho F} = \sqrt[3]{8N/2\rho F} = \sqrt{2H/\rho F} = m/s$$

$$V2f = \sqrt{V_0^2 + 2S/\rho F} = m/s$$

H = Lift in stand or hovering, f.e.: Kg; = $2\rho FV1^2$
I = impuls of mass of fluid
N = Power consumption of Kg m/sec
F = Area of propeller circle = $D^2 pi/4$ with pi = 3.1416
D = Diameter of the propeller, for example, in meter = m
A = Area of wing. Biggest projection, usually vertical projection in $m^2$ $$Nh = \text{Power at hovering} = \sqrt{\left(\frac{1}{\eta}S\right)^3 /2\rho F}$$

$$H = \text{Lift in stand or hovering} = \sqrt[3]{2\rho FN^2} = M\sqrt[3]{2\rho F\left(\frac{\eta N}{M}\right)^2}$$

Ftl = Comparison factor for multiple propellers at equal power
M = Number of propellers $$Ftl = M\sqrt[3]{\frac{\eta^2}{M^2}} = \sqrt[3]{M\eta^2}$$

Lf = Lift of wing section in flight, for example: Kg.
DF = Drag of wing section in flight, for example,: Kg.
Cl = Lift coefficient of wing section
Cd = Drag coefficient of wing section.
$\eta$ = efficiency(ies)
Lf = $(\rho/2)ClAV^2$ = KG
Df = $(\rho/2)CDAV^2$ = KG;
whereat specific attention should be given thereto, that velocity V2 which is created by the propeller provides in some embodiments of the invention a velocity V over a wing section and thereby drag and lift; also attention should be provided, that according to my theories increase in number of propellers at a given power increases lift in stand. In most embodiments of the invention, the plural appearances are overlaying and are overlaid in such a way, that they bring the desired benefit.

DESCRIPTION OF THE PREFERRED EMBODIMENTS

Figure 1:
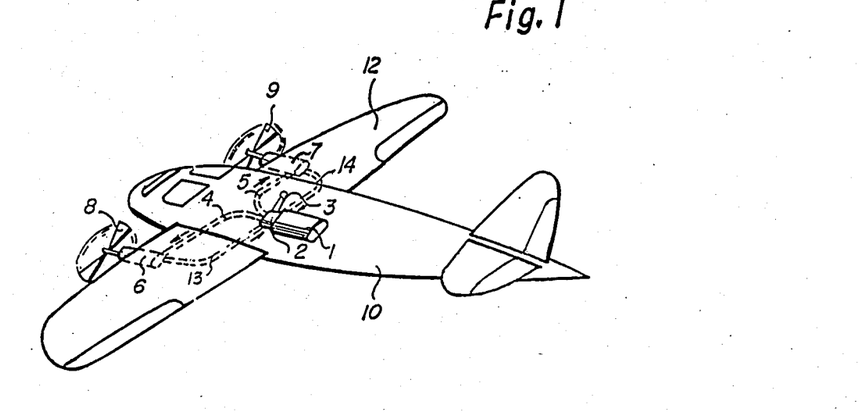
FIG. 1 is a somewhat simplified perspective view illustrating an aircraft provided with an embodiment of the invention.

Referring firstly to FIG. 1, it will be seen that the Figure illustrates an embodiment of a hydraulically controlled fluid-stream driven aircraft which is inexpensive to manufacture, handles well and easily and is very safe in operation. The aircraft has a body 10 provided with a pair of wings 11 and 12. A fluid-flow producing means is mounted on the body 10 and includes a power plant or prime mover 1, and a multiple-flow variable pump 2 of one of the types which will be described with reference to FIGS. 3-5. The rotor of the pump 2 is driven by the prime mover 1, and produces at least two separate flows or streams of hydraulic fluid. Adjusting means 3 is provided which adjusts the fluid flows in the different streams in a sense reducing or increasing the flow, but assuring that in any case the two flows are equal to one another at all times. The flows of fluid may be varied simultaneously between a zero flow rate and the maximum flow rate. Reference numerals 4 and 5 identify fluid passages which extend from the pump 2 to respective positive-displacement fluid motors 6 and 7, which drive propellers 8 and 9, respectively. The spent fluid returns from the motors 6 and 7 via respective return conduits 13 and 14 to the pump 2.

Figure 2:
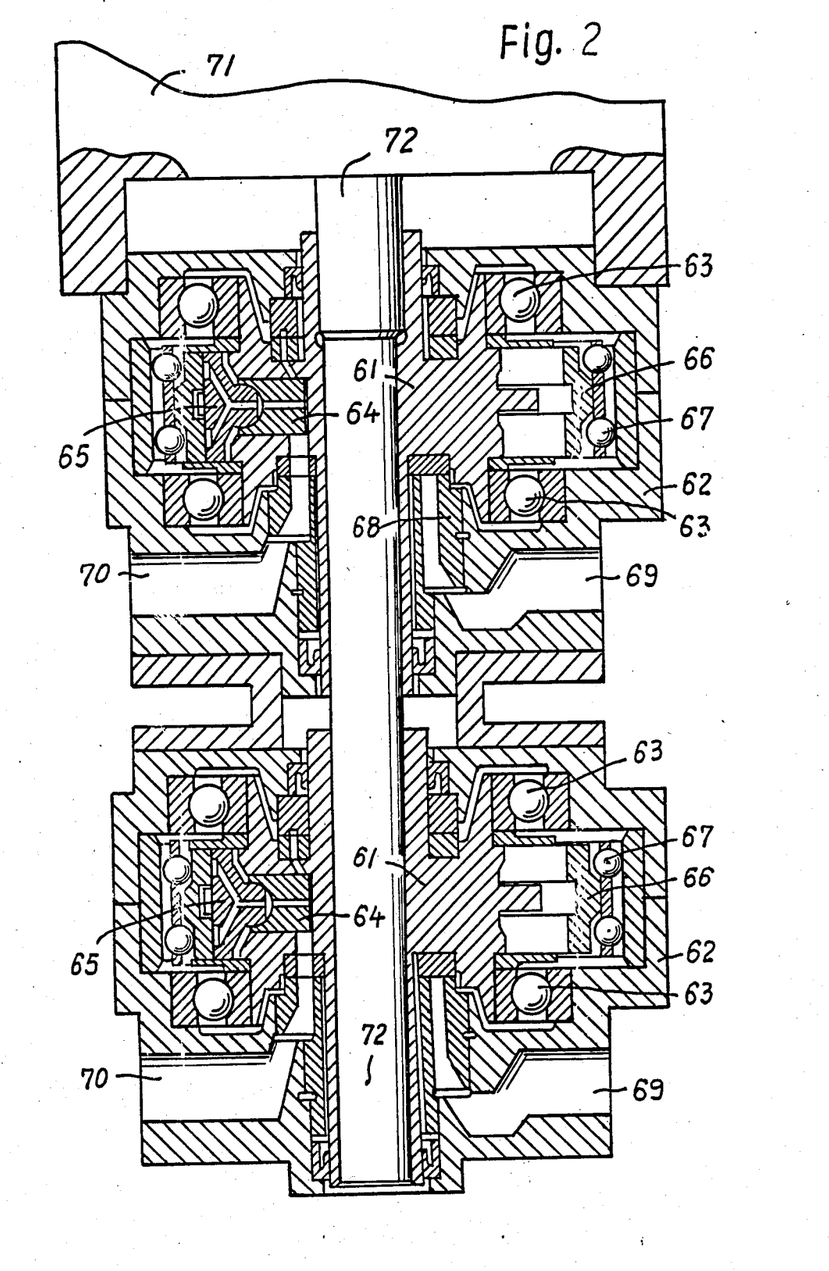
FIG. 2 is a sectional view through a pump of the invention, which is applicable in the aircraft of the invention.

A hydrostatic power supply unit which can be used with advantage in the embodiment of FIG. 1, and which has in fact been diagrammatically illustrated therein, is shown in more detail in FIG. 2. It should be noted that this power unit is of a type which can be separately transported and secured to any desired craft, such as the aircraft in FIG. 1.

FIG. 2 illustrates in detail how in any of the preceding embodiments equally acting actuator means may cooperate equally with the displacement means of the fluid-handling chambers of the respective fluid-flow producing means. In this Figure, reference numeral 71 identifies a power plant which drives a shaft 72 that extends through two coaxial pumps. In the pumps the rotors 61 are rotatably mounted in housings 62. Displacement means 64 serve to draw in and expel fluid with respect to the cylinders in the rotors 61. Piston shoes 65 may be associated with the displacement means 64 which are pistons, between the latter and the actuator means 66, which enforce a definite displacement or stroke of the displacement means 64 in order to actuate each fluid flow at a definite rate of flow. Antifriction bearing 63 may be provided between the rotors 61 and the housings 62, and additional antifriction bearing 67 may be provided between the actuator means 66 and the housings 62. A control member 68 may be provided to establish a fluid-tight seal between the respective rotor 61 and housing 62, and a pair of ports of which one serves for entry of fluid and one for exit of fluid is provided in each pump and communicates with the respective cylinders through passage means located in the housing and rotor and the control member, if the latter is present.

The shaft 72 drives both pumps with equal rotary velocity and may extend through both pumps, but is associated with the engine or power plant and with both of the pumps together.

The two piston stroke actuator means or actuator means 66 are so assembled, that they act equally, that is they operate equally with both pumps to assure that the rate of flow of fluid flowing out of each pump is equal to the rate of flow of fluid flowing out of the other pump. In the illustrated embodiment, the pumps are radial piston pumps, and the pistons 64 and piston shoes 65 which co-operate with the respective actuator means or piston stroke guide means 66 are so controlled by the latter that equal flow rates are assured, since in each pump the central axis of the actuator means 66 is equally spaced from the rotor-axis.

Thus, the pump of FIG. 2 is a fluid flow producing means having at least one pair of separate fluid handling chamber groups of equal volumes, at least one pair of separate outlets 70 or 69, respectively, and includes means for fluid-tight separation of the chambers and outlets so that fluid from each chamber group passes through one of the outlets only; at least one pair of displacement means 64,65 associated with the fluid handling chambers, respectively; equally acting actuator means 66 actuating and defining the displacement volumes of said chambers, respectively, and co-operating at equal times and in unison with said displacement means so that fluid flows in said outlets 70 or 69 at proportionate and equal flow rates.

Figure 4:
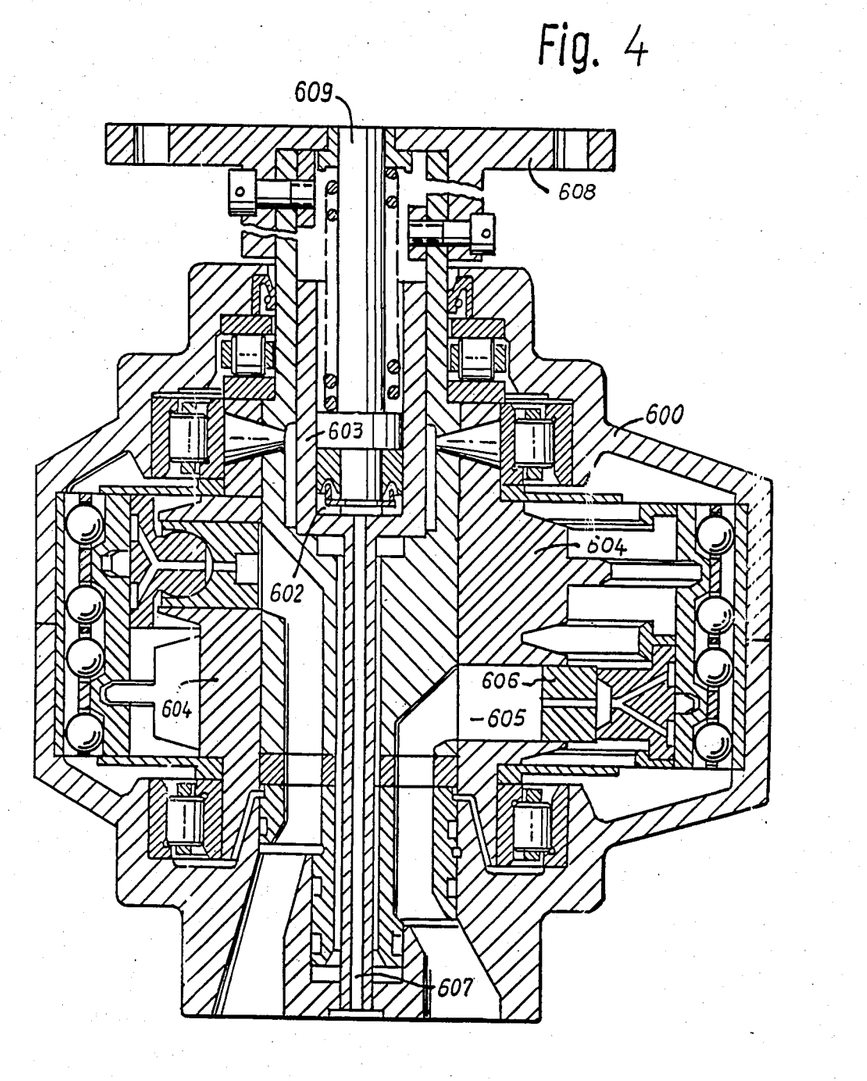
FIG. 4 is a longitudinal sectional view through a propeller driving fluid motor for application in the aircraft of the invention.

One motor of FIG. 4 may for example be applied as motor 7 in FIG. 1 and another motor of FIG. 4 may also be for example applied as motor 6 in FIG. 1. A separated fluid line 5 may then be set from one of the outlets 70 or 69 of FIG. 2 to the respective entrance port of the motor of FIG. 4 which serves as motor 7 in FIG. 1. Another separated fluid line 4 may be set from the other of outlets 70 or 69 of FIG. 2 to the entrance port of the motor of FIG. 4 which acts as motor 6 in FIG. 1. Thereby the motors 6 and 7 of the vehicle of FIG. 1 are forced to revolve their shafts at equal rates of revolution preferredly in opposite rotary directions.

The pump means of FIG. 2 may also serve to drive the motors of others of the Figures. For vehicles with four motors two sets of pump assemblies of FIG. 2 may be used, or any suitable four-flow producing pump means for example that of FIG. 19 of my U.S. Pat. No. 4,171,784.

Figure 3:
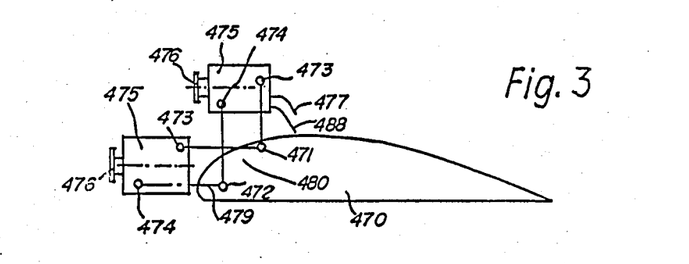
FIG. 3 is a schematic cross sectional view through an aircraft wing whereon a swingable hydraulic propeller driving motor is mounted for swing into position above the wing or into a position before or after the wing, or into any position therebetween, if so desired.

In FIG. 3 it is shown by way of example, how a hydraulic fluid motor is associated to a wing or body. Wing 470 has holders 471 and 472 with pivotable beare- or swing-arms 479 and 480. These are connected by connectors 473 and 474 to propeller-driving fluid motor 475. Fluid motor 475 has a revolvable shaft 476 for holding and driving a respective propeller, the latter not shown in the Figure. For starting or landing on water or on ground the propeller motor 475 is pivoted into the above wing position, the right-up in the Figure. That prevents water coming to the propellers or the propellers coming too close to the ground. In high-speed flight the location of the propeller-axis above the wing however provides a tilting moment to the craft and the forces of resistance and of traction are not in the same plane.

Therefore, according to this Figure the fluid motor is pivoted forward or backward downward into the left-shown position for acting substantially about in the center face through the wing or body. This stabilizes the craft in the air at flight. The swing of the motor from above to before or behind the wing or vice versa is possible due to flexible fluid lines or hoses 477,478.

Thus, the aircraft wing or body of the Figure is especially convenient for low-winged aircraft, for water-aircraft, motor gliders and like. In FIG. 4, which is a longitudinal sectional view through an example of a propeller-driving fluid motor, the housing 600 contains revolvingly borne therein the rotor 604 which has working chambers 605 for intaking fluid and driving pistons 606 in said chambers 605 for revolving the rotor 604 of the motor. The rotor of this embodiment of the invention is provided with a central bore or hub which extends also through the entire motor. A cylinder or thrust chamber 602 is provided in or on the motor and a member or piston 603 is moveable therein. It may be excerted from the other end by spring pressure. It is especially convinent to provide space 602 as a cylinder provided in the rotor hub and a piston 603 axially moveable therein. A fluidline 607 extends through at least a portion of rotor 604 to said space 602 to operate the member 603 therein by fluid pressure. Propeller flange 608 may be mounted to the shaft and rotor of the motor; and member 609 associated to member 603 may extend through propeller shaft 608 to control and drive the variable or swingable members or portions of the associated propeller.

DETAILED DESCRIPTION OF THE PREFERRED SPECIFIC EMBODIMENTS

Figure 5:
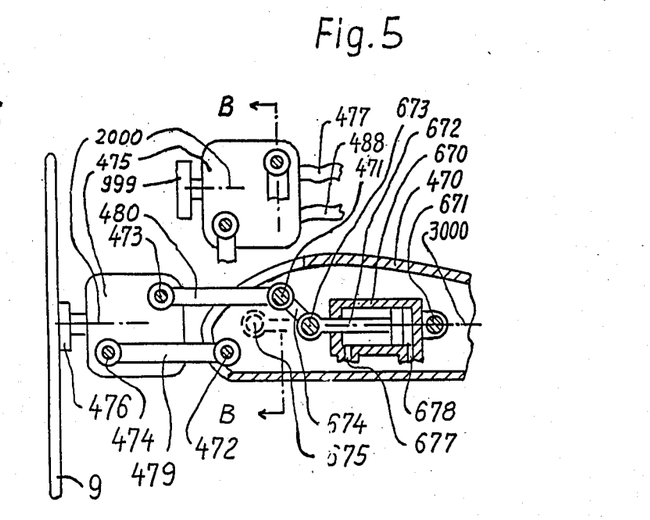
FIG. 5 is a sectional view through a portion of a wing section, illustrating an arrangement therein.
Figure 6:
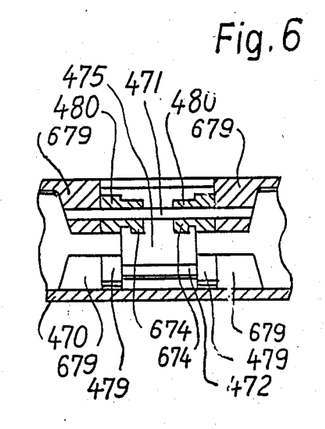
FIG. 6 is a cross sectional view through FIG. 5 along the arrowed line B—B in FIG. 5.

Referring now to FIGS. 5 and 6, it will be seen, that FIG. 5 is substantially equal to FIG. 3. However, FIG. 6 is added to demonstrate in greater detail the swing mechanism by which the fluid motor 475 is swung upwards or downwards.

This embodiment of the invention serves especially to overcome a hazardous difficulty of common aircraft. The aircraft presently still need high fuselages or landing gears, because the big diameters of the propellers or of the jet engines require a certain minimum of distance of the axes of the propellers or jet engines from the ground. The bodies and wings of the aircraft are thereby rather high in the air and that is uncomfortable and cause instability at starting and landing. The high landing gears also provide excessive weight and expense.

A similar difficulty exists when aircraft are waterborne craft, which start and land on water. Then it is often so, that the body of the craft acts as a boat floating on water. (Since the propellers would then, if usually as in other aircraft provided, run with their tips into the water.) Consequently, the engines and propellers of such waterborne aircraft are often situated high above the wings or bodies, mounted on specific holding structures. While that takes care for the starting and landing on water, it is less suitable for flight in air. Because now the axes of the propeller(s) are (is) offset from the medial axis of resistance of the body at flight through air.

The embodiment of FIGS. 5 and 6 of the invention will effectively overcome the mentioned difficulties and inconveniences as well as ineffectiveness of the typical propeller-driven aircraft of today. It therefore provides a fluid motor 475 on a portion of a body, for example on the body of an aircraft or on a wing 470 of an aircraft with a capability to be set into at least two different locations. The first location is the upswung location, where the fluid motor is swung into the higher position. The axes of the fluid motor and of the propeller 9 are now higher than the medial plane through the body or wing 470. In this position, when the propeller 9 with fluid motor 475 is fixed into the first, the upper location, the craft can start or land on water, snow, ice or ground, with respective short bottom portions. High landing gears are spared.

At later flight through the air, the fluid motor 475 with propeller 9 will be swung into the second location, which is the swung down location.

In the swung down location, the axes of the fluid motor 475 and of the propeller 9 are substantially equal to the medial plane through the body 470 or through the wing section 470. Any other suitable location between the two mentioned locations may be set, if so desired.

The embodiment makes thereby possible a starting and landing on ground or water with short landing gears or even on simple wheels. The high structures of present day aircraft can be spared by the arrangement of the invention. At the same time however, the embodiment permits a highly economic forward flight in air without increasing the drag of the aircraft significantly over the drag of equally strong aircraft of today.

In detail, the body or wing 470 may have holders 679 to bear therein swing bars or pivot bars 471,472. Holding arms 479,480 are pivotably borne on the mentioned bars 471 or 472 respectively and on their other ends they are engaging swing portions 473,474 respectively to hold them and thereby to hold the fluid motor 475, whereto the holding portions 473,474 are fastened. Fluid motor 475 may be set and be held, for example, between for example four arms 479,480, two on each lateral side, as seein also in FIG. 6.

To swing the fluid motor 475 with it's propeller 9 from the first into the second location or vice versa, an actuator may be provided. In the Figures the actuator is a fluid cylinder 670 with ports 677,678 to chambers in the cylinder. A piston 672 is axially movable in the cylinder and extends therefrom to be connected by connector 673 to the actuator arm 674. In FIG. 16 the arrangement shows the actuator in the position of location of the second location of the fluid motor and propeller. The dotted lines show the assumed position of location of actuator arm 674 in position 675, when the fluid motor and propeller are swung by the outwards moving piston 672 into the first location of fluid motor and propeller above the wing or body 470. Cylinder 670 may be borne in holder 671. The ports 67 and 678 of cylinder 670 are respectively connected over fluid lines and control means to a fluid power source in order to swing the fluid motor and propeller from the first into the second location and vice versa at the required time of operation of the aircraft or vehicle. The fluid lines 477, 478 to and from the fluid motor 475 are either led through the holding arms or pivot arms or swing arms 479, 480 and through the respective bars or holders or portions 473,474; or they are provided as flexible hoses. The drive fluid to operate the motor 475 and thereby to revolve the propeller 9 is given by supplying pressure fluid through at least one of the fluid lines 477 or 488. So, as it is done in principle also in the other embodiments of the invention.

Figure 7:
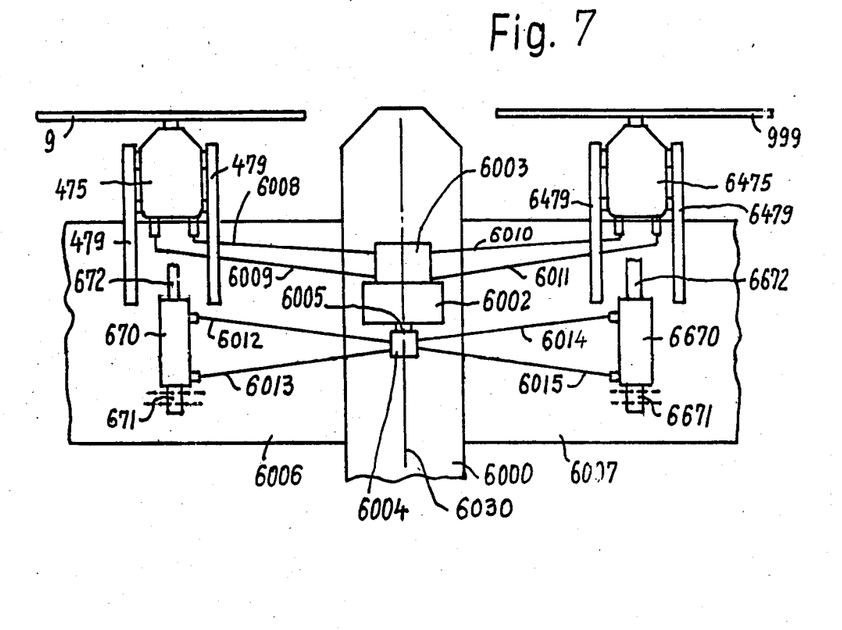
FIG. 7 is a schematic of a view from top onto a portion of a vehicle of the invention with the vehicle capable of travel in air.

In FIG. 7 the body 6000 of a vehicle which is capable of travel in air has a pair of wings which extend laterally from the body. Wing 6006 is a leftwards extending wing and wing 6007 is a rightwards extending wing. Wing 6006 extends laterally leftwards from body 6000 while wing 6007 extends rightwards laterally from the body 6000. Both wings 6006 and 6007 form individually propeller motor holding medial sections at which the motors are swingably fastened and the drive means, like the cylinders 670 and 6670 with the pistons 672 und 6672, are provided to operate the swing up and swing down procedure of the propeller driving motors. The pistons, cylinders, structures, motors and propellers are substantially equal to thoese of FIGS. 3, 5 and 6. Motor 475 drives propeller 9 and motor 6475 drives propeller 999. The means of the arrangements on the leftward wing have equal referential numbers as in FIGS. 5 and 6, while the means on the rightward wing 6007 have a first digit 6 before the remainders of the referential numbers. The last three digits of the rightwing m ans have equal numbers as in FIGS. 5 and 6 and as equal means on the leftward wing, whereby it is explained, that the right side means are equal to the left side means, but are symmetrically located respective to the imaginary medial longitudinal vertical plane 6030 of the vehicle. The body 6000 carries the power plant 6002 which drive a multi flow pump 6003. This may be one of the multi flow pumps of the other figures of this application. The pump 6003 supplies two flows of fluid of equal rate of flow which are individually led from separate outlets of the pump by the individual fluid line 6008 to the entrance port of the leftward wing motor 475 and by the individual fluid line 6010 to the entrance port of the rightward wing motor 6475. Respective return fluid lines 6009 and 6011 return the fluid from the motors to the pump or to the tank of the pump 6003. The body 6000 carries a second, a smaller multi flow pump 6004. This second pump is attached to a coupling means 6005 by which the pump may be coupled or uncoupled with respective portion of the power plant 6002. If the pump is coupled to the power plant it may operate the swing up or the swing down or the holding of the left and right motors 475 and 6475 in theit respective swung up or swan swang down position by the supply of separate control fluid flows to the cylinders 670 and 6670 of the mentioned motors. The fluid lines 6012 to 6015 are thereby control flow fluid lines. Lines 6012 and 6013 communicate ports of pump 6004 with ports of cylinder 670 while lines 6014 and 6015 communicate ports of pump 6004 with ports of cylinder 6670. The rightwards communicated flows act equal and with equal rates of flow at equal times. Thereby it is secured that the right and left motors 475 and 6475 have at all times of rest and of swing up or swing down equal hights and positions. Pump 6004 may again be one of the double or multi flow pumps of other Figures of this application. Instead of providing one medial section on each wing, there may also be a plurality of such sections provided on each wing.

Each of the sections will then carry a respective structure, motor, cylinder and propeller as in FIGS. 5 and 6. The vehicle of this Figure has then four or more propellers and motors symmetrically arranged about the medial plane 6030. The fluid lines and communications are then respectively multiplied compared to those which are shown in this Figure and the pumps 6003 and 6004 have then a respective number of chamber groups and separate ports to permit the setting of the respective number of individual fluid lines.

It will be understood that each of the elements described above, or two or more together, may also find a useful application in other types of constructions differing from the type described above.

While the invention has been illustrated and described as embodied in a fluid-stream driven aircraft, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims.

What is claimed is:

1. A vehicle capable of travel in air, comprising, in combination, a body with at least two wings whereof one of said wings extends laterally leftwards from said body and the other of said wings extends laterally rightwards from said body while said wings are provided with propeller holding sections which are distanced equally laterally from said body;
   wherein each of said holding sections is provided with a streamlined sectional configuration of said section with a longitudinal span and a relatively thereto normal chord, a fluid motor associated to said section to carry and to revolve by fluid which flows from a fluid supply source through the rotor of said motor a propeller which is fastened to said rotor
   wherein said motor is connected to said section by a structure,
   wherein said structure includes means to swing said motor upwards and downwards in normal direction relative to said span and parallel to said chord of said section
   wherein said structure is provided with means to keep the axes of said rotor and propeller at all times substantially parallel to said chord and,
   wherein fluid line portions which include rigid pipes and moveable fluid line portions are provided in said structure and between the ports of said motor and said supply source to permit the flow of fluid to and from different locations of said ports of said motor.

2. The wing of claim 1,
   wherein said fluid motor and said propeller are swung vertically down relative to said section in order to temporarily let said propeller work effectively in air in flight of said section and said motor and propeller are swung vertically up relative to said wing temporarily at other times when said section is close to the surface of the earth.

3. The vehicle of claim 1,
   wherein said structure includes pivot arms with inner and outer ends,
   wherein said section is provided with pivot bars to bear pivotably thereon said inner ends of said arms,
   wherein pivot portions are provided on said motor to bear pivotably thereon said outer ends of said arms,
   wherein said arms are provided parallely relatively to each other,
   wherein said arms have equal lengths and equal distances of the centers of said inner ends and outer ends from each other, and,
   wherein an actuator means is provided to pivot said arms around said pivot bars of said section,
   whereby said motor and said propeller are pivoted from an upper location to a lower location relatively to said section.

4. The vehicle of claim 1,
   wherein said section is a portion of an aircraft,
   wherein said actuator is a fluid cylinder with a therein reciprocating piston,
   wherein said cylinder is connected to said section and said piston is connected at least indirectly to at least one of said arms,
   wherein a control means is provided to said cylinder to actuate and control the movement of said piston and thereby the said pivotion of said motor and propeller from said upper location to said lower location and vice versa, and,
   wherein said pivotion is exercised under maintenance of the direction of the axes of said motor and of said propeller,
   whereby said axes are parallel to their different locations at other times.

5. The vehicle of claim 1,
   wherein said body carries a power plant which operates a proportionate delivery double flow pump with two separate outlets to pass from said outlets separately two individual drive fluid flows or equal rates of flow by individual fluid lines to the drive fluid entrance ports of said motors,
   wherein return fluid lines are set from the outlet ports of said motors to the entrance ports of said double flow pumps at least indirectly,
   wherein a second double flow pump is provided in said body and attached to a coupling means of said power plant,
   wherein said second double flow pump is able to supply two individual control fluid flows of equal rate of flow to individual control flow fluid lines which are communicated from separate outlets of said second double flow pump to the individual entrance ports of individual control cylinders while respective return flow fluid lines are set from the outlet ports of said cylinders to respective inlet ports of said second double flow pump,
   wherein said cylinders contain therein reciprocable pistons which are connected to the said structure to swing said motors up and down in unison when said second double flow pump delivers said control flows, while during the said up and down swing of said motors said control flow fluid lines and said return flow fluid lines which are connected to said second double flow pump operate vice versa,
   whereby said equal rates of flow in said control flow fluid lines secure equalness of operation at equal times of said swing up and swing down of said motors and said equalness of rate of flow in said drive fluid flows secures equal rotary speeds of said propellers.

6. The vehicle of claim 5,
   wherein said double flow pumps are four flow pumps,
   wherein four of said propellers and motors are provided with two thereof on said leftward extending wing and two on said rightward extending wing, while each of said motors and each of said cylinders is communicated separately to said four flow pumps to secure by said equalness of rates of flows equal rotary speeds of said four propellers and equalness of operation at equal times of said swing up and swing down of said motors.

* * * * *